United States Patent [19]

Koyama et al.

[11] Patent Number: 5,194,580

[45] Date of Patent: Mar. 16, 1993

[54] PROCESS FOR PREPARING POLYARYLENE SULFIDES UNDER REDUCED PRESSURE

[75] Inventors: Yoshinari Koyama; Daigo Shirota; Masao Ohmori, all of Ichihara; Minoru Senga, Sodegaura, all of Japan

[73] Assignee: Idemitsu Petrochemical Co., Ltd., Tokyo, Japan

[21] Appl. No.: 387,920

[22] Filed: Aug. 1, 1989

[30] Foreign Application Priority Data

Aug. 5, 1988 [JP] Japan .................................. 63-195844
Dec. 2, 1988 [JP] Japan .................................. 63-305310

[51] Int. Cl.$^5$ ............................................. C08G 75/16
[52] U.S. Cl. ......................................................... 528/388
[58] Field of Search ........................................... 528/388

[56] References Cited

U.S. PATENT DOCUMENTS 3,919,177 11/1975 Campbell ............................. 260/79.1
4,038,263 7/1977 Edmonds, Jr. et al. ............ 260/79.1
4,371,671 2/1983 Anderson ............................. 528/388

FOREIGN PATENT DOCUMENTS 59-22926 2/1984 Japan .
59-98133 6/1984 Japan .
59-109523 6/1984 Japan .
59-217727 12/1984 Japan .
61-7332 1/1986 Japan .
63-39926 2/1988 Japan .

Primary Examiner—Harold D. Anderson
Attorney, Agent, or Firm—Nikaido, Marmelstein, Murray & Oram

[57] ABSTRACT

A process for preparing a polyarylene sulfide involves dehydrating a mixture of a hydrous sulfur source and an organic polar solvent under a reduced pressure in a rectification tower and contacting a dihalogen aromatic compound with a dehydrated sulfur source in the organic polar solvent.

This process provides the polyarylene sulfide with a white color and a higher molecular weight.

19 Claims, No Drawings

PROCESS FOR PREPARING POLYARYLENE SULFIDES UNDER REDUCED PRESSURE

BACKGROUND OF THE INVENTION

1. Field of the Invention

The present invention relates to a process for preparing polyarylene sulfides and, more particularly, to a process for preparing polyarylene sulfides having a higher molecular weight and a high quality with high efficiency and stability. This process can dehydrate raw materials for polymerization at low temperatures and in a short period of time prior to polycondensation. Furthermore, this process can effectively prevent a production of impurities due to decomposition of the raw materials for polymerization. Thus this process is extremely advantageous for preparing the polyarylene sulfides.

2. Description of Related Art

Polyarylene sulfides such as polyphenylene sulfide are resins that are thermoplastic yet partially thermoset, and have excellent properties as engineering plastics, such as resistance to chemicals, mechanical properties over a wide range of temperatures, and resistance to thermal rigidity.

It is known that the polyarylene sulfides such as polyphenylene sulfide are generally prepared by polycondensation of a dihalogen aromatic compound with an alkali metal sulfide in an organic polar solvent. For example, polyphenylene sulfide is prepared by polycondensation of p-dichlorobenzene with sodium sulfide in an organic polar solvent, as disclosed in U.S. Pat. No. 3919177 (counterpart to Japanese Patent Publication No. 12,240/1977).

In order to provide polyarylene sulfides such as polyphenylene sulfide having excellent properties, it is required that their molecular weights become enlarged. Towards this end, a process has been proposed in which the water content in the reaction solution for polymerization is controlled. This process requires the step of dehydrating a hydrous alkali metal sulfide, before the polycondensation, because the alkali metal sulfides are usually available as a hydrate. This dehydration step has usually been carried out by azeotropically distilling off water in the presence of an organic polar solvent. Conventional dehydration steps as disclosed, for example, in Japanese Patent Publication (laid-open) Nos. 98,133/1984 and 7,332/1986 and U.S. Pat. Nos. 4,368,321 and 4,371,671 are carried out at atmospheric pressure using a distilling tower or rectification tower of the usual type. Thus, they suffer the disadvantages that, although heating at high temperatures is required for sufficiently dehydrating raw materials for polymerization, distillation at atmospheric pressure while heating at high temperatures causes solvents and the alkali metal sulfide to be decomposed, thereby leading to a poor quality of the resulting polymer and that the heating at a relatively low temperature as high as 150° C. is unlikely to cause decomposition, but it takes a long dehydration time, thus lessening a production efficiency to a remarkably low extent.

On the other hand, various proposals have heretofore been made to provide the polyarylene sulfides with a higher molecular weight. For example, U.S. Pat. No. 4,038,263 discloses a process for preparing polyphenylene sulfide having a higher molecular weight by polymerizing p-dihalobenzene with an alkali metal sulfide in the presence of a lithium halide in an organic amide. This process contains the dehydration step in which a single distillation method is adopted for the dehydration step, for example, under a stream of nitrogen, however, there remains in a system undehydrated water in an amount higher than monohydrate per mole of the metal sulfide as a source of sulfur. The remaining water content impairs the action of lithium halide which should function as a polymerization aid although the lithium halide is added for the purpose to render the molecular weight of the resulting polyphenylene sulfide larger. As a result, the polyphenylene sulfide is not said to have a sufficient molecular weight.

Japanese Patent Publication (laid-open) No. 217,727/1984 discloses a process for preparing polyphenylene sulfide by polymerizing a polyhalogen aromatic compound with a mixture of 0.1% to 15% by weight of a substantially anhydrous sodium sulfite with 99.9% to 85% by weight of sodium sulfide in an organic polar solvent and under a condition where the water content present in the polymerization system is lower than 0.3 mole per mole of the sodium sulfide. However, this process is not sufficient because a molecular weight of the resulting polyphenylene sulfide is not high enough and a sulfur source to be used should be preprocessed to bring its water content to a given low level.

Japanese Patent Publication (laid-open) Nos. 22,926/1984 and 109,523/1984 propose processes in which dihalogen aromatic compounds are reacted with a substantially anhydrous metal sulfide and metal carbonate in the presence of a minute water content. These processes, however, produce a large quantity of by-products such as oligomers, and the objective products in lesser yields. Furthermore, they require a longer reaction time to make their molecular weights higher so that they are industrially disadvantageous.

A process for preparing polyphenylene sulfide is disclosed in Japanese Patent Publication No. 98,133/1984, which involves reacting p-dihalobenzene with a source of sulfur in a polar solvent of an organic amide type while the water content in the reaction system is still retained in the range from 0.3 to 0.95 mole per mole of the sulfur source. This process can provide polyphenylene sulfide which is relatively stable against energy such as heat, ultraviolet rays and the like, however, it is not said to have a sufficiently high molecular weight.

SUMMARY OF THE INVENTION

Therefore, the present invention has the object to provide a process for preparing a polyarylene sulfide of high molecular weight and quality with high efficiency and stability, which can carry out dehydration of raw materials for polymerization prior to polycondensation, at a lower temperature and in a shorter period of time and which can effectively restrain impurities from occurring due to decomposition during the dehydration.

In order to achieve the object, the present invention consists of a process for preparing a polyarylene sulfide comprising the step of dehydrating a mixture of a hydrous sulfur source and an organic polar solvent under reduced pressures in a rectification tower or column in preparing the polyarylene sulfide by contacting a dihalogen aromatic compound with the sulfur source.

DESCRIPTION OF THE PREFERRED EMBODIMENTS

The polyarylene sulfides are prepared by reacting the dihalogen aromatic compound with the sulfur source. Before contacting the dihalogen aromatic compound with the sulfur source, the hydrous mixture of the hydrous sulfur source with the organic polar solvent is dehydrated under reduced pressures using the rectification tower or column.

The sulfur source to be used may include a hydrous alkali metal sulfide, a hydrous alkali metal hydrosulfide, a hydrous alkaline earth metal sulfide and a hydrous alkaline earth metal hydrosulfide.

As the hydrous alkali metal sulfide may be employed any one commercially available and industrially used, and the hydrous alkali metal sulfide may include, for example, lithium sulfide, sodium sulfide, potassium sulfide, rubidium sulfide and cesium sulfide. Sodium sulfide and lithium sulfide are preferred, and sodium sulfide is more preferred. The hydrous alkali metal sulfide may be in the form of a salt hydrate, such as trihydrate, pentahydrate, hexahydrate and nonahydrate, a hydrate, and an aqueous mixture.

The hydrous alkali metal hydrosulfide may be one commercially available and one for industrial use. It may include, for example, lithium hydrosulfide (LiHS), sodium hydrosulfide (NaHS), potassium hydrosulfide (KHS), rubidium hydrosulfide (RbHS), calcium hydosulfide (CaHS), and cesium hydrosulfide (CsHS). Sodium hydrosulfide and lithium hydrosulfide are preferred, and sodium hydrosulfide is more preferred. The hydrous alkali metal hydrosulfide may be in the form of a salt hydrate such as trihydrate, pentahydrate, hexahydrate and nonahydrate, a hydrate, and an aqueous mixture.

Among the hydrous alkali metal sulfides and hydrosulfides are preferred lithium sulfide and sodium sulfide, and sodium sulfide is more preferred. The hydrous alkali metal sulfide and hydrosulfide may be used singly or in combination thereof.

The hydrous alkaline earth metal sulfide may include, for example, calcium sulfide, strontium sulfide, barium sulfide and magnesium sulfide. Calcium sulfide and barium sulfide are preferred, and calcium sulfide is more preferred. The hydrous alkali metal sulfide may be used singly or in combination thereof.

The hydrous alkaline earth metal hydrosulfide may include, for example, calcium hydrosulfide, strontium hydrosulfide, barium hydrosulfide and magnesium hydrosulfide. Calcium hydrosulfide and barium hydrosulfide are preferred, and calcium hydrosulfide is more preferred. The hydrous alkali metal hydrosulfide may be used singly or in combination thereof.

When the hydrous alkali metal hydrosulfide and the hydrous alkaline earth metal hydrosulfide are employed, it is preferred in a usual case to use it with a base. The base may be any acid receptor which can convert the alkali metal hydrosulfide or the alkaline earth metal hydrosulfide into the respective alkali metal sulfide or alkaline earth metal sulfide or effectively neutralize or receive hydrogen halide producible upon condensation of the alkali metal hydrosulfide or the alkaline earth metal hydrosulfide with the dihalogen aromatic compound and which does not adversely affect the object of the present invention. The base may be of an inorganic type and of an organic type. The inorganic salt may preferably include, for example, an alkali metal hydroxide or the like, such as lithium hydroxide, sodium hydroxide, potassium hydroxide, rubidium hydroxide, and cesium hydroxide. Lithium hydroxide and sodium hydroxide are preferred, and sodium hydroxide is more preferred. The organic salt may include, for example, a metal salt of an $\omega$-hydroxycarboxylic acid and an alkali metal salt of an aminocarboxylic acid. The base such as the alkali metal hydroxide or the like may be used in the form of an anhydride, a hydrate or an aqueous solution. Preferred is the anhydride in a usual case. The base may be used usually in an amount of an equimolar equivalent at the maximum per equivalent (mole) of the hydrous alkali metal hydrosulfide or the hydrous alkaline earth metal hydrosulfide. The base may be used singly or in combination thereof.

In accordance with the process of the present invention, the dehydration is first carried out from the hydrous mixture of the hydrous sulfur source with the organic polar solvent by means of distillation or the like under reduced pressures using a rectification tower or column.

As the organic polar solvent to be used may be used a non-protonic organic solvent such as an amide compound, a lactam compound, a urea compound, and a cyclic organophosphorus compound. The amide compound and the lactam compound are preferred.

The amide compound may include, for example, a formamide such as N,N-dimethylformamide, an acetamide such as N,N-dimethylacetamide, N,N-diethylacetamide and N,N-dipropylacetamide, and an amide such as N,N-dimethylbenzoic amide, and the like.

The lactam compound may include, for example, a caprolactam such as caprolactatm, N-methylcaprolactam, N-ethylcaprolactam, N-n-propylcaprolactam, N-isopropylcaprolactam, N-n-butylcaprolactam, N-isobutylcaprolactam and N-cylcohexylcaprolactam, a pyrrolidone such as N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone and N-methyl-3,4,5-trimethyl-2-pyrrolidone, a piperidone such as N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

As the non-protonic organic polar solvent may be used, for example, tetramethyl urea, N,N'-dimethylethylene urea, N,N'-dimethylpropylene urea, 1-methyl-1-oxosulphorane, 1-ethyl-1-oxosulphorane, 1-phenyl-1-oxosulphorane, 1-methyl-1-oxophosphorane, 1-n-propyl-1-oxophosphorane, 1-phenyl-1-oxophosphorane, and the like.

Among the organic polar solvents, an N-alkyllactam and an N-alkylpyrrolidone are preferred. More preferred is N-methylpyrrolidone. The solvent may be used singly or in combination thereof.

A ratio of the organic polar solvent to the hydrous sulfur source in preparing the hydrous mixture is not restricted to a particular one, and may be conveniently adjusted to amount to such a ratio of the organic polar solvent and the sulfur source in a dehydrated mixture obtainable by means of distillation under reduced pressures in the rectification tower or column to the dihalogen aromatic compound as required for the preparation of the polyarylene sulfide. The ratio of the organic polar solvent to the hydrous sulfur source in weight may be in the range usually from 0.1:1 to 15:1, preferably from 2:1 to 5:1, in order to allow the dehydrated mixture to be merely admixed with the dihalogen aromatic compound in a given ratio.

The hydrous mixture may additionally contain an alkali metal halide as needed. The alkali metal halide may serve as a polymerization aid. The alkali metal halide may include, for example, a fluoride, chloride, bromide and iodide of an alkali metal such as lithium, sodium, potassium, rubidium, and cesium. More specifically, the alkali metal fluoride may include, for example, lithium fluoride, sodium fluoride, potassium fluoride, cesium fluoride, lithium chloride, sodium chloride, potassium chloride, rubidium chloride, cesium chloride, and the like. Preferred is lithium chloride. The alkali metal halide may be used in an amount ranging generally from 0.05 to 2.0 moles, preferably from 0.1 to 1.2 moles, with respect to one mole of the sulfur source. If the amount of the alkali metal halide becomes below the lower limit, an addition thereof may not attain sufficient results and a reaction rate becomes too slow, thus failing to render a molecular weight of the resulting polyarylene sulfide higher and to raise a purity of the resulting product to a higher level. If the amount of the alkali metal halide is increased to above the upper limit, no effects can be expected in accordance with an addition of such a large amount of the halide and it raises costs, thus resulting in a lesser economical efficiency.

When the alkali metal halide is employed, it is preferred to adjust a water content in the hydrous mixture to 1.2 moles or higher with respect to one mole of the sulfur source. If the water content becomes below the lower limit, a limit is placed upon a molecular weight of the resulting polyarylene sulfide and a polyarylene sulfide having a sufficiently high molecular weight cannot be produced. If the addition of the alkali metal halide to the hydrous sulfur source and the organic polar solvent would not amount to a water content in the hydrous mixture as high as 1.2 moles or higher, a further addition of water is required. In this case, it is desired that water should be purified to a high level before addition.

In preparing the hydrous mixture, the hydrous sulfur source is admixed with the organic polar solvent while heating the mixture at a temperature ranging generally from 120° C. to 160° C., preferably from 130° C. to 150° C. If the temperature becomes too low, a long period of time is required for dehydration or a sufficient level of the dehydration cannot be attained. If the temperature reaches above the upper limit, the organic polar solvent may be decomposed at a larger rate and amounts of impurities increase.

In accordance with the process of the present invention, the hydrous mixture is dehydrated under reduced pressures to allow the water content of the mixture so as to preferably amount to less than 1.0 mole with respect to one mole of the sulfur atom of the sulfur source in the mixture.

In distilling the hydrous mixture under reduced pressures in a rectification tower or column, it is preferred to adjust a tower (column) top pressure to reach below 200 Torr, preferably below 150 Torr. If the tower top pressure becomes too high, the heating temperature is required to be elevated to higher than 160° C., thereby causing various disadvantages.

A reflux rate in the rectification tower or column is not restricted to a particular rate and may be any if the rate is within the capacity of the rectification tower or column.

A dehydrating time may vary with a degree of reduced pressures in the rectification tower or column and may range generally from 0.5 to 5 hours, preferably from 0.5 to 3 hours.

The rectification tower or column to be used for the dehydration may be any one which is conventionally used and is not restricted to a particular one.

The resulting dehydrated mixture is then admixed with the dihalogen aromatic compound to react the dihalogen aromatic compound with the sulfur source in the organic polar solvent for the preparation of the polyarylene sulfides.

The dihalogen aromatic compound may be any conventional one and may include, for example, a dihalogen compound such as m-dihalobenzene and p-dihalobenzene; an alkyl-substituted dihalobenzene such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene and 1-n-hexyl-2,5-dihalobenzene; a cycloalkyl-substituted dihalobenzene such as 1-cyclohexyl-2,5-dihalobenzene such as 1-cyclohexyl-2,5-dihalobenzene; an aryl-substituted dihalobenzene such as 1-phenyl-2,5-dihalobenzene, 1-benzyl-2,5-dihalobenzene and 1-p-toluyl-2,5-dihalobenzene; a dihalobiphenyl such as 4,4'-dihalobiphenyl; and a dihalonaphthalene such as 1,4-dihalonaphthalene, 1,8-dihalonaphthalene, and 2,8-dihalonaphthalene. The two halogen atoms in the dihalogen aromatic compounds may be the same or different from each other and may be those replaced, for example, by fluorine, chlorine, bromine or iodine. Dihalobenzene is preferred and p-dichlorobenzene is particularly preferred.

In accordance with the process of the present invention, the dihalogen aromatic compound may be used in an amount ranging generally from 0.75 to 2.0 moles, preferably from 0.90 to 1.2 moles, with respect to mole of the sulfur atom in the sulfur source. The reaction of the dihalogen aromatic compound with the sulfur source may proceed in an equimolar reaction scheme.

An amount of the organic polar solvent is not restricted to a particular one as long as the reaction proceeds in a homogeneous manner, but it is preferred to be within the range from 0.1 to 10 times by weight the total weight of the dihalogen aromatic compound, the sulfur source, and the other ingredients to be added as needed. Using the organic polar solvent in an amount lesser than the lower limit does not proceed the reaction to a sufficient extent while the amount of the solvent above the upper limit worsens a volume efficiency and reduces a productivity of the polyarylene sulfides.

The dihalogen aromatic compound is admixed with the dehydrated mixture so as for the ingredients required for polycondensation to be contained within the ranges as have been described hereinabove.

In accordance with the process of the present invention, the mixture of the dihalogen aromatic compound with the dehydrated mixture may additionally contain, as desired, an active hydrogen-containing haloaromatic compound, a polyhaloaromatic compound having three or more than three halogen atoms or a haloaromatic nitro compound as a branching agent or a monohaloaromatic compound as an end capped agent.

As the active hydrogen-containing haloaromatic compound is employed a haloaromatic compound having a functional group with an active hydrogen, such as an amino group, thiol group, hydroxyl group or the like. More specifically, the active hydrogen-containing haloaromatic compound may include, for example, a dihaloaniline such as 2,6-dichloroaniline, 2,5-dichloroaniline, 2,4-dichloroaniline and 2,3-dichloroaniline, a trihaloaniline such as 2,3,4-trichloroaniline, 2,3,5-trichloroaniline, 2,4,6-trichloroaniline and 3,4,5-trichloroaniline, a dihaloaminodiphenyl ether such as 2,2'-diamino-4,4'-dichlorodiphenyl ether and 2,4'-diamino-2',4-dichlorodiphenyl ether, and those in which the amino group is replaced by the other functional group such as the thiol group or the hydroxyl group.

There may also be used an active hydrogen-containing haloaromatic compound in which a hydrogen atom or atoms joined to the carbon atom or atoms forming its aromatic ring is replaced by another inert group such as a carbohydryl group, i.e., an alkyl group.

The active hydrogen-containing dihaloaromatic compound is preferred, and dichloroaniline is more preferred.

The polyhaloaromatic compound having three or more than three halogen atoms within its molecule may include, for example, 1,2,4-trichlorobenzene, 1,3,5-trichlorobenzene and 1,4,6-trichloronaphthalene.

The haloaromatic nitro compound may include, for example, a mono- or di-halonitrobenzene such as 2,4-dinitrochlorobenzene or 2,5-dichloronitrobenzene, a dihalonitrodiphenyl ether such as 2-nitro-4,4'-dichlorodiphenyl ether, a dihalonitrodiphenyl sulfone such as 3,3'-dinitro-4,4'-dichlorodiphenyl sulfone, a dihalonitropyridine such as 2,5-dichloro-3-nitropyridine or 2-chloro-3,5-dinitropyridine, or a dihalonitronaphthalene.

These active hydrogen-containing haloaromatic, polyhaloaromatic, and haloaromatic nitro compounds may increase branches of the resulting polymer, thereby increasing a molecular weight thereof or decreases an amount of remaining salts, thereby further improving various characteristics of the resulting polymer. They may be used singly or in combination thereof.

The monohaloaromatic compound may include, for example, chlorobenzene, bromobenzene, α-bromobenzene, α-chlorotoluene, o-chlorotoluene, m-chlorotoluene, p-chlorotoluene, α-bromotoluene, o-bromotoluene, m-bromotoluene, and p-bromotoluene.

The monohaloaromatic compound as an end capped agent may be used singly or in combination thereof.

The polycondensation according to the process of the present invention may be carried out at a reaction temperature in the range generally from 180° C. to 330° C., preferably from 220° C. to 300° C. If the reaction temperature becomes too low, a reaction speed becomes too slow to be practically applicable. If the reaction temperature becomes too high, side reactions may occur or the resulting polymer is deteriorated, thereby causing coloration or gellation.

A reaction time may vary with the kinds and amounts of the ingredients and a polymerization aid as well as the reaction temperature, and it may be in the range generally within 20 hours, preferably from 0.1 to 6 hours.

The polycondensation reaction may be carried out in an inert gas atmosphere and the inert gas may include, for example, nitrogen, argon or carbon dioxide.

A reaction pressure for the polycondensation is not restricted to a particular range and may be in the range up to 50 kg/cm$^2$ (absolute pressure) from the self pressure of a polycondensation system such as the catalyst.

The polycondensation may be carried out by means of a one-stage reaction at a stationary temperature or a multistage reaction in which the temperature is elevated in a stepwise manner or in a gradually and continuously elevating manner.

After completion of the polycondensation, the resulting polyarylene sulfide may be separated directly from a reactor or a reaction vessel by means of a standard method such as filtration or centrifugal separation, or separated from the reaction mixture after an addition of water and/or a flocculating agent such as a dilute acid.

The polymer separated is then washed usually with water, methanol, acetone, benzene or toluene to remove the alkali metal halide, alkali metal sulfide, polymerization aid, by-products and the like adhering to the polymer. The resulting polymer may be recovered by removing the solvent from the reaction mixture without separation therefrom and by washing the residue in the same manner as above. The solvent recovered may be reused. The polymerization aid can be recovered from the reaction mixture as a mother liquor separated and/or washings after use and re-used for polymerization after purification.

The polyarylene sulfide prepared in accordance with the process of the present invention is in a high degree of whiteness and high in purity and has a higher molecular weight, and it is prepared in a very high yield with readiness and stability.

The polyarylene sulfide may be utilized and processed into various molding materials. If required, a salt content such as sodium chloride in the polymer may be reduced to a lesser extent by means of various desalting treatments. The polyarylene sulfide may be admixed with other polymers, pigments, fillers such as graphite, metallic powders, glass powders, quartz powder, glass fibers and the like, stabilizers, lubricants and the like for molding. It may be appropriately used in electric and electronic fields or for general use molding articles.

It is to be noted that the present invention presents the advantage that the hydrous mixture of the hydrous sulfur source with the organic polar solvent is dehydrated under reduced pressures by means of the rectification tower or column prior to polycondensation which is carried out by contacting the dihalogen aromatic compound with the sulfur source, thus preventing a production of impurities upon dehydration. Furthermore, as the polycondensation is carried out upon a contact of the dihalogen aromatic compound with the sulfur source in the organic polar solvent using the dehydrated mixture containing lesser amounts of impurities, the polyarylene sulfide such as polyphenylene sulfide having superior characteristics as having a sufficiently higher molecular weight and a high degree of whiteness can be produced in a high yield as well as with high efficiency and stability. This process is extremely useful for the preparation of the polyarylene sulfides on an industrial scale.

The present invention will be described by way of examples with reference to comparative examples.

EXAMPLE 1

A mixing vessel was charged with 139.5 g (0.83 mole) of sodium sulfide pentahydrate, 35.2 g (0.83 mole) of lithium chloride and 500 ml of N-methyl-2-pyrrolidone (NMP) and the content was stirred while heating at 25° C.

The resulting hydrous mixture was then distilled in a rectification tower at a tower bottom temperature of 145° C. and a tower top pressure of 100 Torr while refluxing at an overall reflux rate for a distilling time of 2 hours, thus yielding a dehydrated mixture.

The dehydrated mixture was measured for its water content and an amount in which the sodium sulfide was decomposed. The results are shown in Table below.

A 2-liter autoclave (is made of "SUS 316L") was charged with the resulting dehydrated mixture and a solution of 124 g (0.84 mole) of p-dichlorobenzene in 300 ml of N-methyl-2-pyrrolidone, and the mixture was subjected to polycondensation at a reaction temperature of 260° C. for a reaction time of 3 hours. After completion of the reaction, the temperature within the autoclave was reduced to room temperature and the reaction mixture was washed with water and acetone in conventional manner.

The resulting solid material was heated and dried at 100° C. for 20 hours under highly reduced pressures, producing polyphenylene sulfide in a white color in a 91% yield. Its inherent viscosity, $\eta_{inh}$, was measured when dissolved in 1-chloronaphthalene having a concentration of 0.4 g/dl at a temperature of 206° C. and is shown in Table below.

The reaction mixture was measured for impurities and it was found that, an impurities, a N-methyl-2-pyrrolidone/p-dichlorobenzene (NMP-PDCB) additive, phenol, p-chlorophenol and N-methylaminobutyric acid are contained in concentrations as shown in Table below.

COMPARATIVE EXAMPLE

Sodium sulfide pentahydrate, lithium chloride and N-methyl-2-pyrrolidone were admixed in amounts as shown in Table below in the same manner as in Example 1. The hydrous mixture was then dehydrated under conditions as shown in Table below. The dehydrated mixture was found to have a water content and an amount of sodium sulfide decomposed as shown in Table below.

The dehydrated mixture was then admixed with p-dichlorobenzene (PDCB) and N-methylpyrrolidone in amounts and under reaction conditions as shown in Table below in the same manner as in Example 1, producing polyphenylene sulfide in a 87% yield. It was found that the polyphenylene sulfide was measured in the same manner as in Example 1, providing a viscosity and containing impurities in amounts as shown in Table below.

As is apparent from Table below, the polyarylene sulfide prepared in accordance with the present invention contains impurities less than that prepared in Comparative Example. The polyarylene sulfide prepared by the process according to the present invention is higher in a degree of whiteness and in a molecular weight.

EXAMPLE 2

An autoclave with a rectification column was charged with 91.30 g (0.543 moles) of sodium sulfide pentahydrate (Na$_2$S.5H$_2$O), 23.01 g (0.543 moles) of lithium chloride (LiCl), and 304 ml of N-methyl-2-pyrrolidone (NMP), and the mixture was dehydrated by means of rectification at a pressure of 150 Torr for 90 minutes while refluxing all NMP at a temperature of 150° C. A water content of the dehydrated mixture was found to be 0.6 mole with respect to mole of sulfur atom in the sodium sulfide.

Then 79.43 g (0.540 mole) of p-dichlorobenzene (PDCB) was molten and added to the autoclave and the autoclave was closed. After the temperature was elevated to 260° C., the reaction was carried out for 3 hours and the temperature was cooled to room temperature leaving the product in a slurry form. This product was then filtered and washed three times with 1 liter of purified water and twice with 1 liter of aceton. The resulting polymer was dried at 100° C. for 20 hours in vacuum.

The resulting polymer was found to be 0.34 in inherent viscosity, $\eta_{inh}$, when measured in α-chloronaphthalene with a concentration of 0.4 g/dl at a temperature of 206° C. This means that the resulting polymer has a sufficient molecular weight.

The yield (granule yield) of the polyphenylene sulfide was 91%.

TABLE

|   |   | Example 1 | Comparative Example |
|---|---|---|---|
| (1) | Mixing: | | |
|  | Sodium sulfide 5H$_2$O | 139.5 g | 139.5 g |
|  | (mole) | (0.83) | (0.83) |
|  | Lithium chloride | 35.2 g | 35.2 g |
|  | (mole) | (0.83) | (0.83) |
|  | Methylpyrrolidone (NMP) (ml) | 500 | 500 |
|  | Mixing Temperature (°C.) | 25 | 25 |
| (2) | Distillating (Dehydrating): | | |
|  | Tower bottom temp. (°C.) | 145 | 204 |
|  | Tower top pressure (Torr) | 100 | 760 |
|  | Reflux rate | overall | overall |
|  | Distilling time (hour) | 2 | 4 |
| (3) | Dehydrated mixture | | |
|  | Amount of Na$_2$S Decomposed (% mole) | ≦0.5 | 4 |
|  | Water content (per Na$_2$S) (mole) | 0.48 | 0.60 |
| (4) | Polycondensation: | | |
|  | p-Dichlorobenzene (PDCB) (mole) | 124 g(0.84) | 124 g(0.84) |
|  | N-methylpyrrolidone (ml) | 300 | 300 |
|  | Reaction temp. (°C.) | 260 | 260 |
|  | Reaction time (hour) | 3 | 3 |
| (5) | Inherent viscosity of Polymer ($\eta$ inh) | 0.31 | 0.25 |
| (6) | Yield of Polymer (%) | 91 | 87 |
| (7) | Impurities in Reaction Mixt. | | |
|  | NMP-PDCB additive (ppm) | 260 | 520 |
|  | Phenol (ppm) | 10 | 70 |
|  | p-Chlorophenol (ppm) | ≦10 | 110 |
|  | N-Methylaminobutyric acid (ppm) | 2,200 | 4,300 |

What is claimed is:

1. A process for preparing a polyarylene sulfide comprising:
   the step of dehydrating, in a rectification tower, a mixture of a hydrous sulfur source and an organic polar solvent at a reduced pressure of up to 200 Torr at the top of said rectification tower; and
   the step of contacting a dihalogen aromatic compound with said dehydrated sulfur source in said organic polar solvent.

2. A process as claimed in claim 1, wherein said hydrous sulfur source is a hydrous alkali metal sulfide, a hydrous alkali metal hydrosulfide, a hydrous alkaline earth metal sulfide, a hydrous alkaline earth metal hydrosulfide or a mixture thereof.

3. A process as claimed in claim 2, wherein said hydrous alkali metal sulfide is sodium sulfide or lithium sulfide.

4. A process as claimed in claim 2, wherein said alkali metal hydrosulfide is sodium hydrosulfide or lithium hydrosulfide.

5. A process as claimed in claim 2, wherein said alkaline earth metal sulfide is calcium sulfide or barium sulfide.

6. A process as claimed in claim 2, wherein said alkaline earth metal hydrosulfide is calcium hydrosulfide or barium hydrosulfide.

7. A process as claimed in claim 1, wherein said dihalogen aromatic compound is a dihalobenzene, an alkyl-substituted or cycloalkyl-substituted dihalobenzene, a dihalobiphenyl or a dihalonaphthalene.

8. A process as claimed in claim 1, wherein said dihalogen aromatic compound is a dihalobenzene.

9. A process as claimed in claim 8, wherein said dihalobenzene is dichlorobenzene.

10. A process as claimed in claim 1, wherein said organic polar solvent is a non-protonic organic solvent.

11. A process as claimed in claim 1, wherein said solvent is an amide compound, a lactam compound, a urea compound or a cyclic organophosphorus compound.

12. A process as claimed in claim 1, wherein said solvent is an alkyl lactam or alkylpyrrolidone.

13. A process as claimed in claim 1, wherein said solvent is N-methylpyrrolidone.

14. A process as claimed in claim 1, wherein said mixture additionally contains an alkali metal halide.

15. A process as claimed in claim 14, wherein said alkali metal halide is an alkali metal chloride.

16. A process as claimed in claim 15, wherein said alkali metal chloride is lithium chloride.

17. A process as claimed in claim 14, wherein a water content of said sulfur source in said mixture is 1.2 mole or more with respect to mole of the sulfur atom of the sulfur source.

18. A process as claimed in claim 1, wherein the mixture is dehydrated until a water content of the sulfur source reaches 1.0 mole or lower with respect to a mole of the sulfur atom in the compound containing the sulfur source.

19. A process as claimed in claim 1, wherein the mixture is dehydrated at a pressure of 100 Torr measured at the top of a rectification tower.

* * * * *